United States Patent
Chubb et al.

(10) Patent No.: US 9,429,954 B2
(45) Date of Patent: Aug. 30, 2016

(54) FLIGHT CONTROL FOR AN AIRBORNE WIND TURBINE

(71) Applicant: Google Inc., Mountain View, CA (US)

(72) Inventors: Erik Christopher Chubb, San Francisco, CA (US); Damon Vander Lind, Alameda, CA (US); Brian Hachtmann, San Martin, CA (US)

(73) Assignee: Google Inc., Mountain View, CA (US)

( * ) Notice: Subject to any disclaimer, the term of this patent is extended or adjusted under 35 U.S.C. 154(b) by 402 days.

(21) Appl. No.: 14/137,286

(22) Filed: Dec. 20, 2013

(65) Prior Publication Data

US 2016/0011600 A1   Jan. 14, 2016

(51) Int. Cl.
*G05D 1/08* (2006.01)
*B64C 17/00* (2006.01)
*B64C 39/02* (2006.01)

(52) U.S. Cl.
CPC ............. *G05D 1/0816* (2013.01); *B64C 17/00* (2013.01); *B64C 39/022* (2013.01); *B64C 39/024* (2013.01); *G05D 1/0866* (2013.01); *B64C 2201/021* (2013.01); *B64C 2201/042* (2013.01)

(58) Field of Classification Search
CPC combination set(s) only.
See application file for complete search history.

(56) References Cited

U.S. PATENT DOCUMENTS

| | | | |
|---|---|---|---|
| 3,181,810 A | | 5/1965 | Olson |
| 4,251,040 A | * | 2/1981 | Loyd ............... B64C 39/022 244/1 R |
| 4,601,444 A | * | 7/1986 | Lindenbaum ........... B64B 1/24 244/2 |
| 5,931,416 A | * | 8/1999 | Carpenter ............ A63H 27/08 244/155 A |
| 6,254,034 B1 | * | 7/2001 | Carpenter ............ A63H 27/08 244/153 R |
| 7,510,143 B1 | | 3/2009 | Bertelsen et al. |
| 8,463,465 B2 | | 6/2013 | Piasecki et al. |
| 8,496,200 B2 | | 7/2013 | Yoeli |
| 2009/0302149 A1 | | 12/2009 | Fuchs et al. |
| 2010/0026007 A1 | * | 2/2010 | Bevirt ................ B64C 31/06 290/55 |
| 2010/0295303 A1 | | 11/2010 | Lind et al. |
| 2011/0121570 A1 | * | 5/2011 | Bevirt ................ F03D 5/06 290/44 |
| 2011/0184593 A1 | | 7/2011 | Swope |
| 2011/0285590 A1 | | 11/2011 | Wellington |
| 2012/0179308 A1 | | 7/2012 | Peters |
| 2012/0265376 A1 | | 10/2012 | Fleiger-Holmes et al. |

(Continued)

OTHER PUBLICATIONS

International Search Report mailed on Mar. 11, 2015, issued in connection with International Patent Application No. PCT/US2014/069558, filed on Dec. 10, 2014, 2 pages.

(Continued)

*Primary Examiner* — Thomas Tarcza
*Assistant Examiner* — Edward J Pipala
(74) *Attorney, Agent, or Firm* — McDonnell Boehnen Hulbert & Berghoff LLP

(57) ABSTRACT

An example method may include receiving data representing an initial position and an initial attitude of an aircraft. The method further includes determining a change to a first attribute and a second attribute of the position or the attitude of the aircraft to achieve a subsequent position and a subsequent attitude. The method also includes determining a priority sequence for changing the first attribute and the second attribute of the position or the attitude of the aircraft based on a first thrust of the actuator to achieve the change to the first attribute and a second thrust of the actuator to achieve the change to the second attribute. The priority sequence is configured to cause changes to the first attribute before causing changes to the second attribute where the actuator is unable to concurrently provide the first thrust and the second thrust.

20 Claims, 10 Drawing Sheets

(56) References Cited

U.S. PATENT DOCUMENTS

| | | | |
|---|---|---|---|
| 2012/0319407 A1* | 12/2012 | Glass | F03D 1/04 290/55 |
| 2013/0221679 A1* | 8/2013 | Vander Lind | B64C 31/06 290/55 |
| 2014/0183300 A1* | 7/2014 | MacCulloch | B64C 39/024 244/1 TD |
| 2015/0039161 A1* | 2/2015 | Hastings | A63H 30/02 701/3 |

OTHER PUBLICATIONS

Written Opinion of the International Searching Authority mailed on Mar. 11, 2015, issued in connection with International Patent Application No. PCT/US2014/069558, filed on Dec. 10, 2014, 25 pages.

* cited by examiner

FLIGHT CONTROL FOR AN AIRBORNE WIND TURBINE

BACKGROUND

Unless otherwise indicated herein, the materials described in this section are not prior art to the claims in this application and are not admitted to be prior art by inclusion in this section.

Many techniques and systems exist for controlling a flight path of an aircraft. Generally, an ability to change a position or an attitude of the aircraft will depend on the location and functionality of actuators included as part of the aircraft.

SUMMARY

In one example, a method is provided that includes receiving data representing an initial position and an initial attitude of an aircraft configured to be coupled to a ground station via a tether. The aircraft includes an actuator configured to change a position and an attitude of the aircraft. The method also includes determining a change to a first attribute and a second attribute of the position or the attitude of the aircraft to achieve a subsequent position and a subsequent attitude. The method further includes determining a priority sequence for changing the first attribute or the second attribute of the position or the attitude of the aircraft based on a first thrust of the actuator to achieve the change to the first attribute and a second thrust of the actuator to achieve the change to the second attribute. The priority sequence is configured to cause changes to the first attribute before causing changes to the second attribute where the actuator is unable to concurrently provide the first thrust and the second thrust. The method also includes causing the actuator to change the first attribute and the second attribute according to the priority sequence.

In another example, a computer readable storage memory having stored therein instructions, that when executed by a computing device that includes one or more processors, cause the computing device to perform functions is provided. The functions comprise receiving data representing an initial position and an initial attitude of an aircraft configured to be coupled to a ground station via a tether. The aircraft includes an actuator configured to change a position and an attitude of the aircraft. The functions further comprise determining a change to a first attribute and a second attribute of the position or the attitude of the aircraft to achieve a subsequent position and a subsequent attitude. The functions further comprise determining a priority sequence for changing the first attribute and the second attribute of the position or the attitude of the aircraft based on a first thrust of the actuator to achieve the change to the first attribute and a second thrust of the actuator to achieve the change to the second attribute. The priority sequence is configured to cause changes to the first attribute before causing changes to the second attribute where the actuator is unable to concurrently provide the first thrust and the second thrust. The functions further comprise causing the actuator to change the first attribute and the second attribute according to the priority sequence.

In still another example, a system is provided that comprises one or more processors and memory configured to store instructions, that when executed by the one or more processors, cause the system to perform functions. The functions comprise receiving data representing an initial position and an initial attitude of an aircraft configured to be coupled to a ground station via a tether. The aircraft includes an actuator configured to change a position and an attitude of the aircraft. The functions further comprise determining a change to a first attribute and a second attribute of the position and the attitude of the aircraft to achieve a subsequent position and a subsequent attitude. The functions further comprise determining a priority sequence for changing the first attribute and the second attribute of the position and the attitude of the aircraft based on a first thrust of the actuator to achieve the change to the first attribute and a second thrust of the actuator to achieve the change to the second attribute. The priority sequence is configured to cause changes to the first attribute before causing changes to the second attribute where the actuator is unable to concurrently provide the first thrust and the second thrust. The functions further comprise causing the actuator to change the first attribute and the second attribute according to the priority sequence.

In yet another example, a system is provided that includes a means for receiving data representing an initial position and an initial attitude of an aircraft configured to be coupled to a ground station via a tether. The aircraft includes an actuator configured to change a position and an attitude of the aircraft. The system further comprises means for determining a change to a first attribute and a second attribute of the position or the attitude of the aircraft to achieve a subsequent position and a subsequent attitude. The system further comprises means for determining a priority sequence for changing the first attribute and the second attribute of the position or the attitude of the aircraft based on a first thrust of the actuator to achieve the change to the first attribute and a second thrust of the actuator to achieve the change to the second attribute. The priority sequence is configured to cause changes to the first attribute before causing changes to the second attribute where the actuator is unable to concurrently provide the first thrust and the second thrust. The system further comprises means for causing the actuator to change the first attribute and the second attribute according to the priority sequence.

These as well as other aspects, advantages, and alternatives, will become apparent to those of ordinary skill in the art by reading the following detailed description, with reference where appropriate to the accompanying figures.

DETAILED DESCRIPTION

Figure 1:
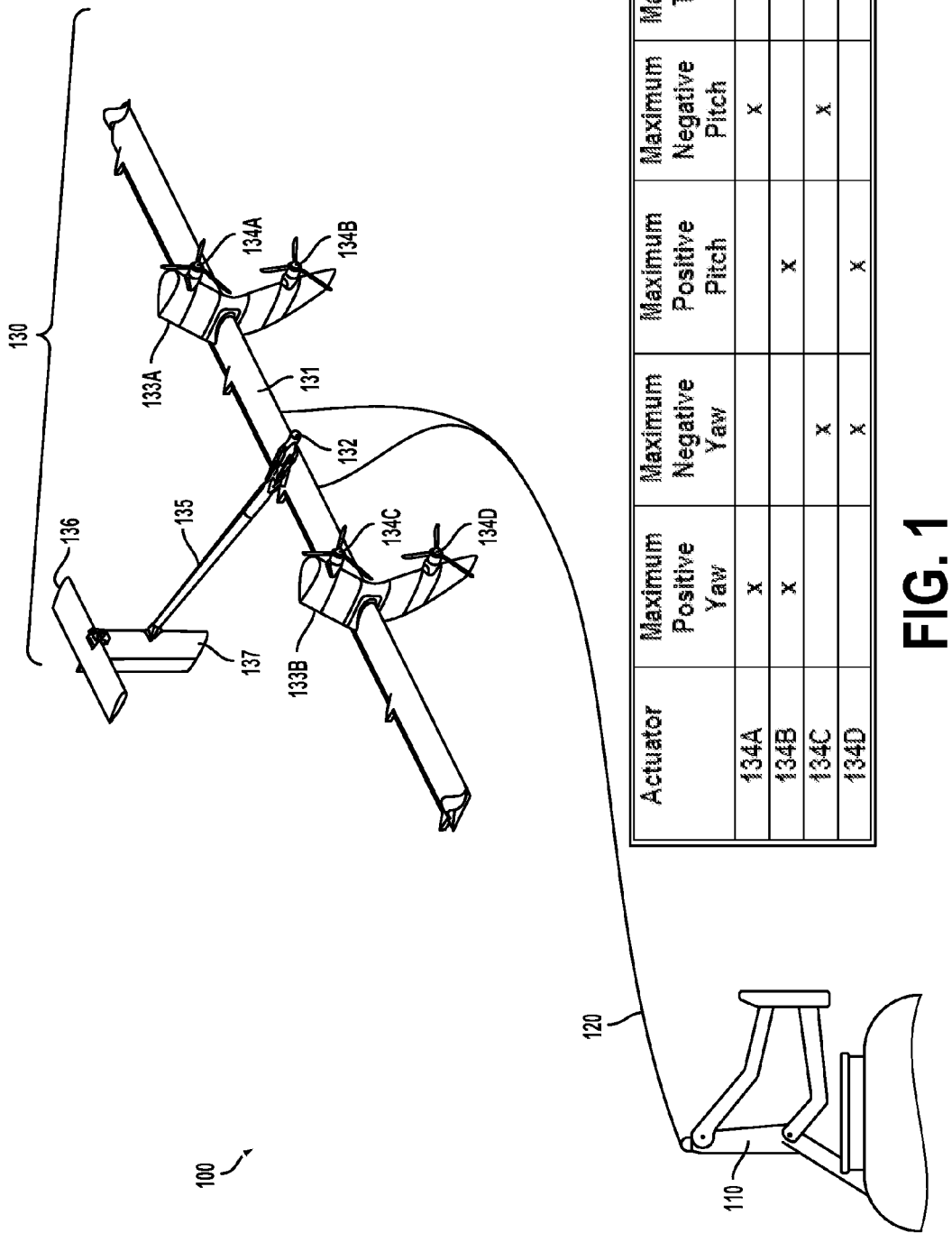
FIG. 1 depicts an example tethered flight system.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a processor may be configured to receive data representing an initial position and an initial attitude of an aircraft from sensors of the aircraft. (The processor may be part of a larger control system.) The aircraft may include at least one actuator configured to apply force to the aircraft to cause the aircraft to change position or attitude. Furthermore, the processor may be configured to determine a change to the position and the attitude of the aircraft to achieve a subsequent position and a subsequent attitude. In order to place the aircraft at the subsequent position and attitude, the processor may next determine a first attribute and a second attribute of the position or the attitude of the aircraft to be changed to achieve the subsequent position and the subsequent attitude. Such attributes of position may include an azimuth angle, an altitude, and a horizontal distance from a ground station. A horizontal distance may refer to a distance along the ground. Attributes of attitude may include pitch, roll, and yaw angles about axes of the aircraft. For example, the first attribute may include altitude and the second attribute may include yaw. In another example, the first attribute may include pitch and the second attribute may include roll. Attributes of position may also be expressed in rectangular or spherical coordinates.

By further example, the processor may be configured to determine a first thrust and a second thrust. The first thrust may be a maximum thrust that the actuator is configured to apply to the aircraft to change the first attribute towards the subsequent position or attitude, based on the current position and attitude of the aircraft. The second thrust may also be a maximum thrust that the actuator is configured to apply to the aircraft to change the second attribute towards the subsequent position or attitude, based on the current position or attitude of the aircraft. For example, based on the current position and attitude of the aircraft, changing the yaw angle of the aircraft as quickly as possible may require the actuator to be idle, while quickly changing the altitude of the aircraft may require the actuator to provide full thrust.

Based on the actuator being unable to simultaneously provide thrusts optimized to change both the first attribute and the second attribute, the processor may determine a priority sequence for changing the first and second attributes. The priority sequence may be determined based on a distance of the aircraft from the ground station, a speed of an apparent wind, or a tension on the tether. The processor may then cause the actuator to provide the first thrust, thereby committing the actuator's full actuating ability towards changing the first attribute.

Referring now to the figures, FIG. 1 depicts a tethered flight system 100, according to an example embodiment. The tethered flight system 100 may include a ground station 110, a tether 120, and an aircraft 130. As shown in FIG. 1, the aircraft 130 may be connected to the tether 120, and the tether 120 may be connected to the ground station 110. The tether 120 may be attached to the ground station 110 at one location on the ground station 110, and attached to the aircraft 130 at two locations on the aircraft 130. However, in other examples, the tether 120 may be attached at multiple locations to any part of the ground station 110 or the aircraft 130.

The ground station 110 may be used to hold or support the aircraft 130 until the aircraft 130 is in a flight mode. The ground station 110 may also be configured to reposition the aircraft 130 such that deploying the aircraft 130 is possible. Further, the ground station 110 may be further configured to receive the aircraft 130 during a landing. The ground station 110 may be formed of any material that can suitably keep the aircraft 130 attached or anchored to the ground while in hover flight, forward flight, or crosswind flight.

In addition, the ground station 110 may include one or more components (not shown), such as a winch, that may vary a length of the tether 120. For example, when the aircraft 130 is deployed, the one or more components may be configured to pay out or reel out the tether 120. In some implementations, the one or more components may be configured to pay out or reel out the tether 120 to a predetermined length. As examples, the predetermined length could be equal to or less than a maximum length of the tether 120. Further, when the aircraft 130 lands on the ground station 110, the one or more components may be configured to reel in the tether 120.

The tether 120 may transmit electrical energy generated by the aircraft 130 to the ground station 110. In addition, the tether 120 may transmit electricity to the aircraft 130 to power the aircraft 130 for takeoff, landing, hover flight, or forward flight. The tether 120 may be constructed in any form and using any material which allows for the transmission, delivery, or harnessing of electrical energy generated by the aircraft 130 or transmission of electricity to the aircraft 130. The tether 120 may also be configured to withstand one or more forces of the aircraft 130 when the aircraft 130 is in a flight mode. For example, the tether 120 may include a core configured to withstand one or more forces of the aircraft 130 when the aircraft 130 is in hover flight, forward flight, or crosswind flight. The core may be constructed of high strength fibers. In some examples, the tether 120 may have a fixed length or a variable length.

The aircraft 130 may include various types of devices, such as a kite, a helicopter, a wing, or an airplane, among other possibilities. The aircraft 130 may be formed of solid structures of metal, plastic, polymers, or any material which allows for a high thrust-to-weight ratio and generation of electrical energy which may be used in utility applications. Additionally, the materials may allow for a lightning hardened, redundant or fault tolerant design which may be capable of handling large or sudden shifts in wind speed and wind direction. Other materials may be possible as well.

As shown in FIG. 1, the aircraft 130 may include a main wing 131, a front section 132, actuator connectors 133A-B, actuators 134A-D, a tail boom 135, a tail wing 136, and a vertical stabilizer 137. Any of these components may be shaped in any form which allows for the use of lift to resist gravity or move the aircraft 130 forward.

The main wing 131 may provide a primary lift for the aircraft 130 during forward flight, wherein the aircraft 130 may move through air in a direction substantially parallel to a direction of thrust provided by the actuators 134A-D so that the main wing 131 provides a lift force substantially perpendicular to the apparent wind or to a ground. The main wing 131 may be one or more rigid or flexible airfoils, and may include various control surfaces or actuators, such as winglets, flaps, rudders, elevators, etc. The control surfaces may be used to steer or stabilize the aircraft 130 or reduce or increase drag on the aircraft 130 during hover flight, forward flight, or crosswind flight. The main wing 131 may be any suitable material for the aircraft 130 to engage in hover flight, forward flight, or crosswind flight. For example, the main wing 131 may include carbon fiber or e-glass. Moreover, the main wing 131 may have a variety dimensions. For example, the main wing 131 may have one or more dimensions that correspond with a conventional wind turbine blade. The front section 132 may include one or more components, such as a nose, to reduce drag on the aircraft 130 during flight.

The actuator connectors 133A-B may connect the actuators 134A-D to the main wing 131. In some examples, the actuator connectors 133A-B may take the form of or be similar in form to one or more pylons. In the example depicted in FIG. 1, the actuator connectors 133A-B are arranged such that the actuators 134A and 134B are located on opposite sides of the main wing 131 and actuators 134C and 134D are also located on opposite sides of the main wing 131. The actuator 134C may also be located on an end of the main wing 131 opposite of the actuator 134A, and the actuator 134D may be located on an end of main wing 131 opposite of the actuator 134B.

In a power generating mode, the actuators 134A-D may be configured to extract energy from an apparent wind using drag or lift forces to drive one or more generators for the purpose of generating electrical energy. As shown in FIG. 1, the actuators 134A-D may each include one or more blades. The actuator blades may rotate via interactions with the wind and could be used to drive the one or more generators. In addition, the actuators 134A-D may also be configured to provide a thrust to the aircraft 130 during flight. As shown in FIG. 1, the actuators 134A-D may function as one or more propulsion units, such as a propeller. Although the actuators 134A-D are depicted as four actuators in FIG. 1, in other examples the aircraft 130 may include any number of actuators.

In a forward flight mode, the actuators 134A-D may be configured to generate a forward thrust substantially parallel to a velocity vector of the aircraft or to the tail boom 135. Based on the position of the actuators 134A-D relative to the main wing 131 depicted in FIG. 1, the actuators may be configured to provide a maximum forward thrust for the aircraft 130 when all of the actuators 134A-D are operating at full power. The actuators 134A-D may provide equal or about equal amounts of forward thrusts when the actuators 134A-D are operating at full power, and a net rotational force applied to the aircraft by the actuators 134A-D may be zero.

Figure 4C:
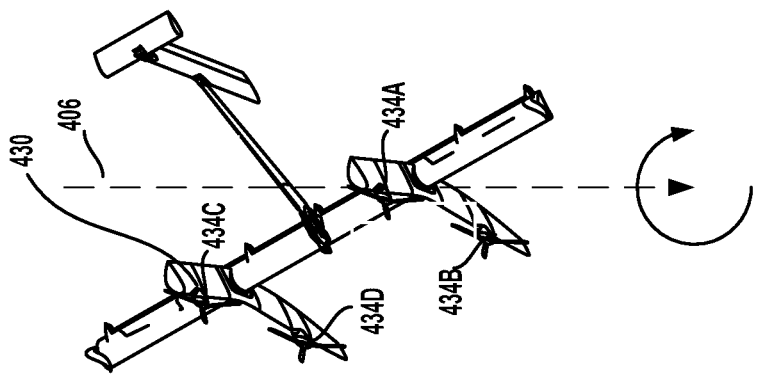
FIG. 4C depicts an example yaw axis of the aircraft.
Figure 4B:
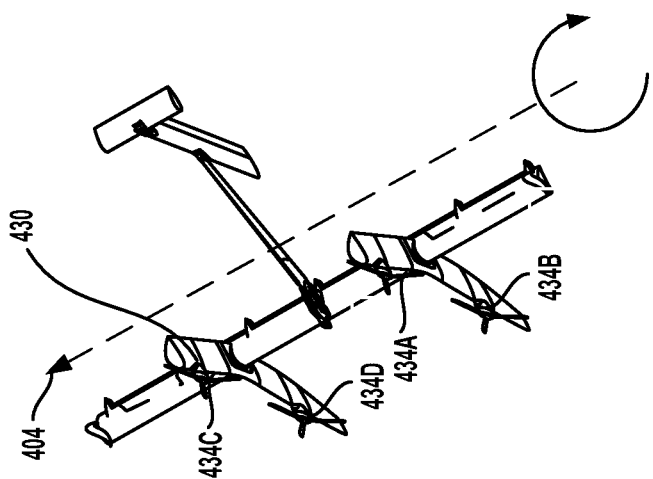
FIG. 4B depicts an example pitch axis of the aircraft.

During flight, it may be useful to rotate the aircraft 130 to various orientations or attitudes. For example, it may be useful to rotate the aircraft 130 by a certain angle about an axis parallel to a span of the main wing 131 that passes through a center of mass of the aircraft 130. Such an attitude adjustment may be referred to as a pitch adjustment. A pitch adjustment may be achieved by causing the actuators 134A and 134C to operate at full power while causing the actuators 134B and 134D to idle (or by causing the actuators 134A and 134C to operate at higher powers than the actuators 134B and 134D). As shown in FIG. 1, such a pitch adjustment may cause the front section 132 to rotate towards the ground. Such a pitch adjustment may be referred to as a negative pitch adjustment by convention. Alternatively the actuators 134B and 134D may be caused to operate at full power while the actuators 134A and 134C are caused to idle, causing the front section 132 to rotate away from the ground. By convention, such an adjustment may be referred to as a positive pitch adjustment. However, definitions of positive and negative pitch are arbitrary and included only as examples. The positive pitch adjustment may also be achieved by causing the actuators 134B and 134D to operate a higher power than the actuators 134A and 134C. Generally, pitch adjustments may be performed using other combinations of thrusts provided by the actuators 134A-D. A further example of a pitch adjustment is depicted in FIG. 4B.

It may also be useful to rotate the aircraft 130 by a certain angle about an axis perpendicular to a plane defined by the tail boom 135 and the span of main wing 131. The axis may pass through the center of mass of the aircraft 130. Such an attitude adjustment may be referred to as a yaw adjustment. A yaw adjustment may be achieved by causing the actuators 134A and 134B to operate at full power while causing the actuators 134C and 134D to idle (or by causing the actuators 134A and 134B to operate at higher powers than the actuators 134C and 134D). During forward flight the aircraft may be travelling substantially parallel to the ground and the yaw adjustment may cause the aircraft to change a direction or heading of horizontal travel (substantially parallel to the ground). The yaw adjustment may be referred to as a positive yaw adjustment by convention. Alternatively the actuators 134C and 134D may be caused to operate at full power while the actuators 134A and 134B are caused to idle (or the actuators 134C and 134D may be caused to operate at higher powers than the actuators 134A and 134B). By convention such an adjustment may be referred to as a negative yaw adjustment. However, characterizations of positive and negative yaw are arbitrary and included only as examples. Generally, yaw adjustments may be performed using other combinations of thrusts provided by the actuators 134A-D. A further example of a yaw adjustment is depicted in FIG. 4C.

Furthermore, it may be useful to cause the aircraft 130 to engage in a maximum rate of position change. The actuators 134A-D may each be caused to provide (equal) maximum thrusts to the aircraft 130, thereby causing the aircraft 130 to undergo the maximum rate of position change. It should be noted that in some embodiments, a certain position change may first require a change in the attitude of the aircraft such that the actuators 134A-D are aligned to provide thrust in a direction that would move the aircraft toward the subsequent position.

The tail boom 135 may connect the main wing 131 to the tail wing 136 and the vertical stabilizer 137. The tail boom 135 may have a variety of dimensions. Moreover, in some implementations, the tail boom 135 could take the form of a body or fuselage of the aircraft 130. In such implementations, the tail boom 135 may carry a payload.

The tail wing 136 or the vertical stabilizer 137 may be used to steer or stabilize the aircraft 130 or reduce drag on the aircraft 130 during hover flight, forward flight, or crosswind flight. For example, the tail wing 136 or the vertical stabilizer 137 may be used to maintain a pitch or a yaw attitude of the aircraft 130 during hover flight, forward flight, or crosswind flight. In FIG. 1, the vertical stabilizer 137 is attached to the tail boom 135, and the tail wing 136 is located on top of the vertical stabilizer 137. The tail wing 136 may have a variety of dimensions.

While the aircraft 130 has been described above, it should be understood that the methods and systems described herein could involve any aircraft that is connected to a tether, such as the tether 120.

Figure 2:
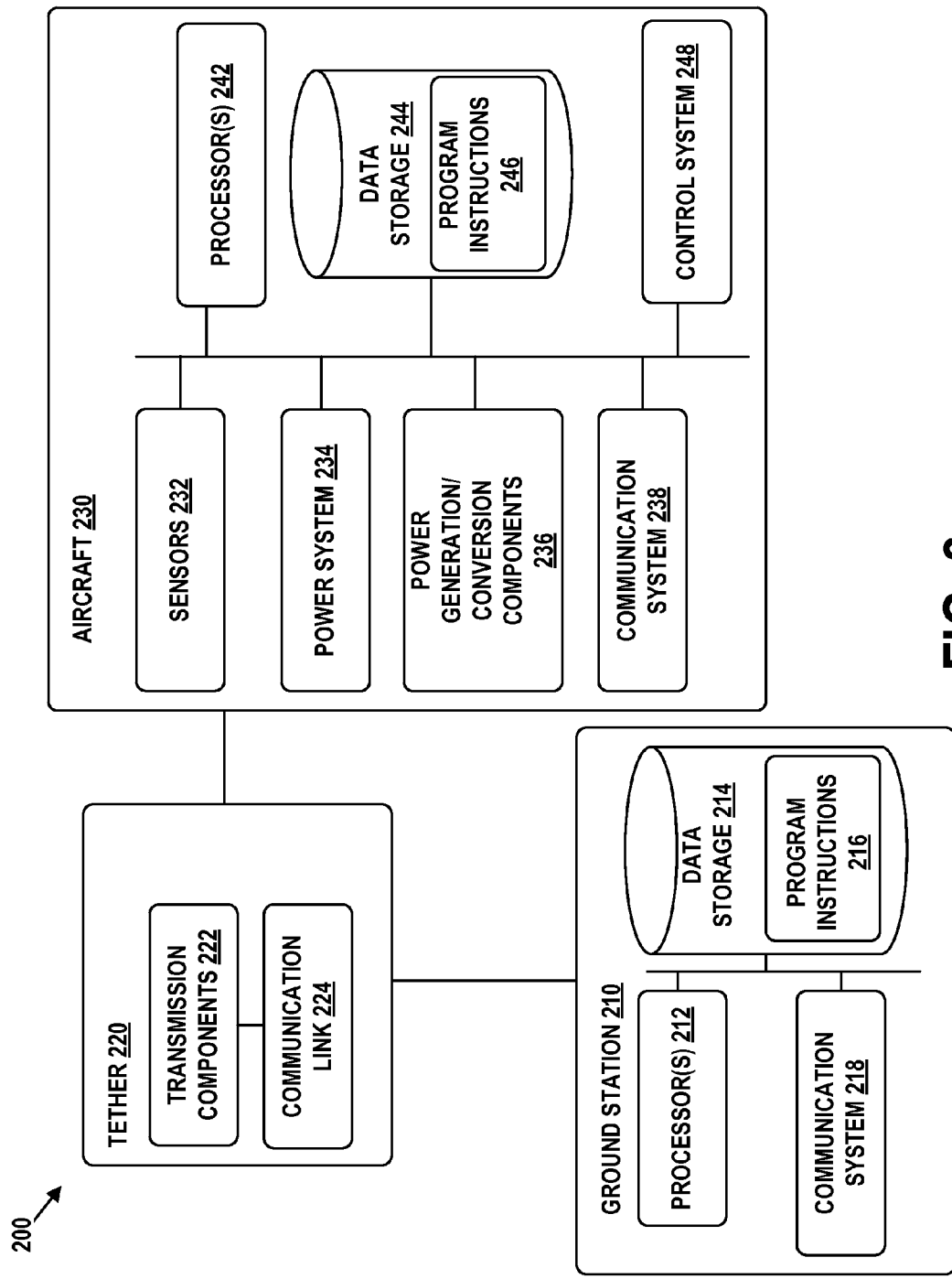
FIG. 2 is a simplified block diagram illustrating example components of the tethered flight system.

FIG. 2 is a simplified block diagram illustrating components of the tethered flight system 200. The tethered flight system 200 may include the ground station 210, the tether 220, and the aircraft 230. As shown in FIG. 2, the ground station 210 may include one or more processors 212, data storage 214, program instructions 216, and a communication system 218. A processor 212 may be a general-purpose processor or a special purpose processor (e.g., digital signal processors, application specific integrated circuits, etc.). The one or more processors 212 may be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include the communication system 218. The communications system 218 may include one or more wireless interfaces or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network. The ground station 210 may communicate with the aircraft 230, other ground stations, or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot", or as a gateway or proxy between a remote support device (e.g., the tether 220, the aircraft 230, and other ground stations) and one or more data networks, such as a cellular network or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aircraft 230 to the ground station 210 or transmit electrical energy from the ground station 210 to the aircraft 230. The transmission components 222 may take various different forms in different embodiments. For example, the transmission components 222 may include one or more conductors that are configured to transmit electricity. And in at least one such example, the one or more conductors may include aluminum or any other material which allows for the conduction of electric current. Moreover, in some implementations, the transmission components 222 may surround a core of the tether 220 (not shown).

The ground station 210 could communicate with the aircraft 230 via the communication link 224. The communication link 224 may be bidirectional and may include one or more wired or wireless interfaces. Also, there could be one or more routers, switches, or other devices or networks making up at least a part of the communication link 224.

Further, as shown in FIG. 2, the aircraft 230 may include one or more sensors 232, a power system 234, power generation/conversion components 236, a communication system 238, one or more processors 242, data storage 244, program instructions 246, and a control system 248.

The sensors 232 could include various different sensors in different embodiments. For example, the sensors 232 may include a global positioning system (GPS) receiver. The GPS receiver may be configured to provide data that is typical of GPS systems (which may be referred to as a global navigation satellite system (GNNS)), such as the GPS coordinates of the aircraft 230. Such GPS data may be utilized by the tethered flight system 200 to provide various functions described herein.

As another example, the sensors 232 may include one or more wind sensors, such as one or more pitot tubes. The one or more wind sensors may be configured to detect apparent or relative wind. Such wind data may be utilized by the tethered flight system 200 to provide various functions described herein.

Still as another example, the sensors 232 may include an inertial measurement unit (IMU). The IMU may include both an accelerometer and a gyroscope, which may be used together to determine the orientation or attitude of the aircraft 230. In particular, the accelerometer can measure the orientation of the aircraft 230 with respect to earth, while the gyroscope measures the rate of rotation around an axis, such as a centerline of the aircraft 230. IMUs are commercially available in low-cost, low-power packages. For instance, the IMU may take the form of or include a miniaturized Micro-ElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aircraft 230, errors in measurement may compound over time. However, an example aircraft 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aircraft 230 may also include a pressure sensor or barometer, which can be used to determine the altitude of the aircraft 230. Alternatively, other sensors, such as sonic altimeters or radar altimeters, can be used to provide an indication of altitude, which may help to improve the accuracy of or prevent drift of the IMU. The sensors 232 may also include a force sensor, spring scale, or other sensors configured to measure a tension force on the tether 220. Such sensors may be included as part of the ground station 210, the tether 220, or the aircraft 230.

As noted, the aircraft 230 may include the power system 234. The power system 234 could take various different forms in different embodiments. For example, the power system 234 may include one or more batteries that provide power to the aircraft 230. In some implementations, the one or more batteries may be rechargeable and each battery may be recharged via a wired connection between the battery and a power supply or via a wireless charging system, such as an inductive charging system that applies an external time-varying magnetic field to an internal battery or a charging system that uses energy collected from one or more solar panels.

As another example, the power system 234 may include one or more motors or engines for providing power to the aircraft 230. In one embodiment, the power system 234 may provide power to the actuators 134A-D of the aircraft 130, as shown and described in FIG. 1. In some implementations, the one or more motors or engines may be powered by a fuel, such as a hydrocarbon-based fuel. In such implementations, the fuel could be stored on the aircraft 230 and delivered to the one or more motors or engines via one or more fluid conduits, such as piping. In some implementations, the power system 234 may be implemented in whole or in part on the ground station 210.

As noted, the aircraft 230 may include the power generation/conversion components 236. The power generation/conversion components 236 could take various different forms in different embodiments. For example, the power generation/conversion components 236 may include one or more generators, such as high-speed, direct-drive generators. The one or more generators may be driven by one or more rotors or actuators, such as the actuators 134A-D as shown and described in FIG. 1.

Moreover, the aircraft 230 may include a communication system 238. The communication system 238 may take the form of or be similar in form to the communication system 218 of the ground station 210. The aircraft 230 may communicate with the ground station 210, other aircrafts, or other entities (e.g., a command center) via the communication system 238.

In some implementations, the aircraft 230 may be configured to function as a "hot spot" or as a gateway or proxy between a remote support device (e.g., the ground station 210, the tether 220, other aircrafts) and one or more data networks, such as cellular network or the Internet. Configured as such, the aircraft 230 may facilitate data communications that the remote support device would otherwise be unable to perform by itself.

For example, the aircraft 230 may provide a WiFi connection to the remote device, and serve as a proxy or gateway to a cellular service provider's data network, which the aircraft 230 might connect to under an LTE or a 3G protocol, for instance. The aircraft 230 could also serve as a proxy or gateway to other aircrafts or a command station, which the remote device might not be able to otherwise access.

As noted, the aircraft 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aircraft 230 may include the control system 248. In some implementations, the control system 248 may be configured to perform one or more functions described herein. The control system 248 may be implemented with mechanical systems or with hardware, firmware, or software. As one example, the control system 248 may take the form of program instructions stored on a non-transitory computer readable medium and a processor that executes the instructions. The control system 248 may be implemented in whole or in part on the aircraft 230 or at least one entity remotely located from the aircraft 230, such as the ground station 210. Generally, the manner in which the control system 248 is implemented may vary, depending upon the particular embodiment.

Figure 3A:
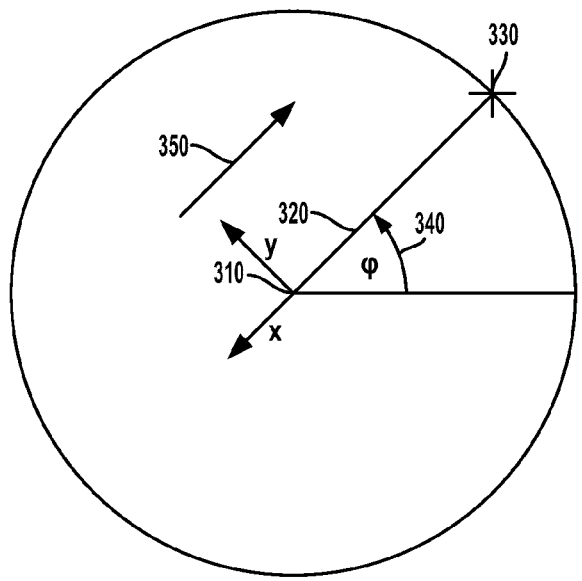
FIG. 3A depicts a downward looking view of the example tethered flight system.

FIG. 3A depicts a downward looking view of an example tethered flight system 300 which may include a ground station 310, a tether 320, and an aircraft 330. Also depicted in FIG. 3A is an azimuth angle 340 and an apparent wind 350. As shown in FIG. 3A, the ground station 310 may be coupled to the tether 320 at a first end of the tether 320 while the tether 320 may be coupled to the aircraft 330 at a second end of the tether 320. The aircraft 330 may be configured to freely fly in an azimuthal direction about the ground station 310. A position of the aircraft 330 may be characterized in part by the azimuth angle 340 between a reference angle and the azimuthal position of the aircraft 330. (The azimuth angle 340 may be designated by "φ".) The ground station 310 may be rotated so as to deploy the aircraft 330 in a direction parallel to the apparent wind 350. With respect to the ground station 310, an "x" axis may be defined as parallel to the apparent wind 350 with a direction of decreasing "x" corresponding with a direction of the apparent wind 350. Similarly, a "y" axis may be defined as perpendicular to the apparent wind 350 with a direction of increasing "y" parallel to a vector originating at a center of mass of the aircraft 330 and pointing towards an end of the main wing of the aircraft corresponding to the actuators 134C-D, depicted and described in FIG. 1 (i.e. a starboard, or right end of the main wing when facing in a direction of increasing "x").

Figure 3B:
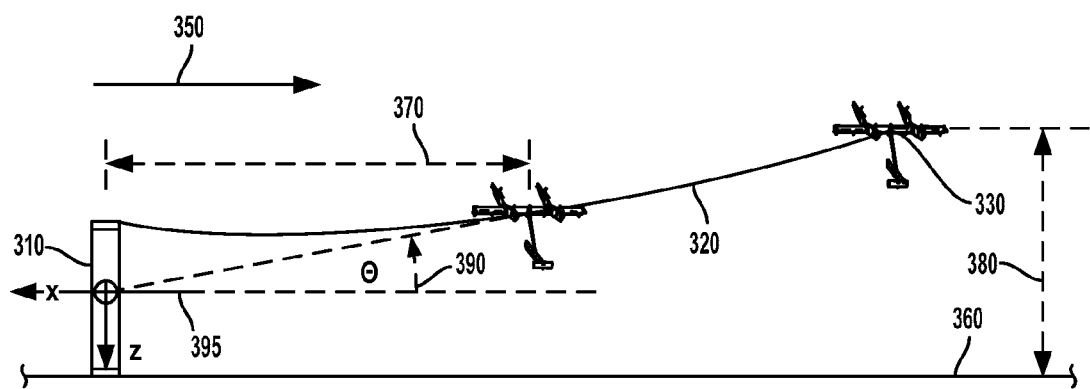
FIG. 3B depicts examples of the aircraft engaging in hover flight at various horizontal positions and altitudes.

FIG. 3B depicts examples of the aircraft 330 engaging in hover flight at various horizontal positions and altitudes. The aircraft 330 may be tethered to the ground station 310 via the tether 320. FIG. 3B also depicts the apparent wind 350, a ground 360, a horizontal distance 370, an altitude 380 of the aircraft, an elevation angle 390 of the aircraft, and a perch 395. The horizontal distance 370 may refer to a distance between the aircraft 330 and the ground station 310 along the ground 360, while the altitude 380 may refer to a distance the aircraft 330 is above the ground 360.

Hover flight may be characterized by the aircraft 330 travelling at an attitude such that a primary force resisting a force of gravity on the aircraft 330 is provided by the thrust of the actuators of the aircraft 330. The aircraft 330 may be deployed in a direction parallel to the apparent wind 350. In such a configuration, the actuators may be oriented to provide thrust in a direction substantially perpendicular to the ground 360 and the main wing may be oriented so that the main wing is not configured to apply a lift force to the aircraft 330 in a direction perpendicular to the ground 360. During hover flight, lift generating surfaces of the main wing, the tail wing, and the horizontal stabilizer may not be effective in generating lift as the lift generating surfaces may either be oriented to face substantially parallel to a direction of travel of the aircraft 330, or may not be impacted with a sufficient apparent wind 350 to generate a lift force. In hover flight, forces causing the aircraft 330 to move along a flight path may include forces provided by the actuators and the apparent wind 350.

Hover flight may begin with deploying the aircraft 330 from the ground station 310 in a hover-flight orientation. The ground station 310 may be rotated so as to deploy the aircraft 330 in an azimuthal direction parallel with the apparent wind 350. Deploying the aircraft 330 in the direction of the apparent wind 350 may enable the aircraft 330 to travel the horizontal distance 370 from the ground station 310 while the actuators of aircraft 330 are thrusting in a substantially vertical direction. The tether 320 may be paid out or reeled out as the aircraft 330 achieves increasing horizontal distance 370 from the ground station 310. Hover flight may include the aircraft 330 ascending, descending, or hovering over the ground 360 at an altitude 380 above the ground 360.

A vertical position of the aircraft 330 may also be characterized by the elevation angle 390, which may be an angle defined by the perch 395 of the ground station 310 and the aircraft 330, with the perch 395 as a vertex. In other embodiments, the vertex of the elevation angle 390 may occur at the ground 360 and characterize an elevation of the aircraft 330 above the ground 360.

With respect to the ground station 310, an "x" axis, a "y" axis, and a "z" axis may be defined. The "x" axis may be defined as parallel to the apparent wind 350 with a direction of decreasing "x" corresponding with the direction of the apparent wind 350. The "z" axis may be defined as parallel to a vertical support of the ground station 310 with increasing "z" corresponding with decreasing altitude. In one embodiment, as depicted in FIG. 3B, an origin of the axes may be located at a point where the perch 395 of the ground station 310 intersects the vertical support of ground station 310. However, definitions of axes may be arbitrary and the origin may be located at any point.

Figure 4A:
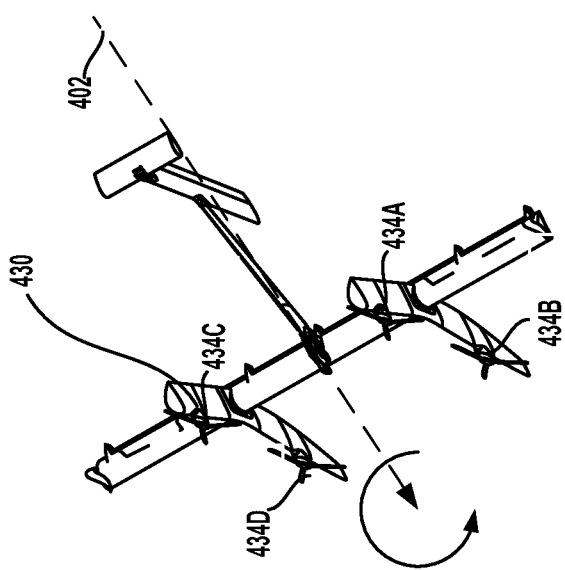
FIG. 4A depicts an example roll axis of the aircraft.

FIG. 4A depicts an example roll axis 402 of an aircraft 430. In one embodiment, the aircraft 430 may include actuators positioned to apply a torque thrust to the aircraft 430 about the roll axis 402 of the aircraft 430, causing the aircraft 430 to rotate about the roll axis 402. To land and couple the aircraft 430 onto the ground station it may be useful for the aircraft 430 to assume a particular roll angle with respect to a reference roll angle. During forward flight, roll adjustments of aircraft 430 may be made by changing a position of flaps on the main wing of the aircraft 430. It should be noted that the definition of the roll axis 402 is arbitrary and the roll axis 402 may constitute a different axis in another embodiment.

FIG. 4B depicts an example pitch axis 404 of the aircraft 430. The aircraft 430 may include actuators 434A-D positioned to apply a torque thrust about the pitch axis 404 of the aircraft 430. To pitch the aircraft 430 in a negative direction, the actuators 434A and 434C may provide thrust while the actuators 434B and 434D are idle. Alternatively, the aircraft 430 may be pitched in a positive direction by causing the actuators 434B and 434D to provide thrust and causing the actuators 434A and 434C to be idle. Using the actuators 434A-D to provide pitch control for the aircraft 430 may be useful during hover flight, during which the tail wing of the aircraft 430 may not be configured to provide a torque about the pitch axis 404 of the aircraft 430. It should be noted that definitions of positive and negative pitch and the pitch axis 404 are arbitrary and not meant to be limiting. The pitch axis 404 may constitute a different axis in another embodiment.

FIG. 4C depicts an example yaw axis 406 of the aircraft 430. The aircraft 430 may include the actuators 434A-D positioned to apply a torque thrust about the yaw axis 406 of the aircraft 430. To yaw the aircraft 430 in a negative direction, the actuators 434C and 434D may provide thrust while the actuators 434A and 434B are idle. Alternatively, the aircraft 430 may be yawed in a positive direction by causing the actuators 434A and 434B to provide thrust and causing the actuators 434C and 434D to be idle. Using the actuators 434A-D to provide yaw control may be useful during hover flight during which the vertical stabilizer of the aircraft 430 may not be configured to provide a torque about the yaw axis 406 of the aircraft 430. It should be noted that definitions of positive and negative yaw and the yaw axis 406 are arbitrary and not meant to be limiting. The yaw axis 406 may constitute a different axis in another embodiment.

Figure 5:
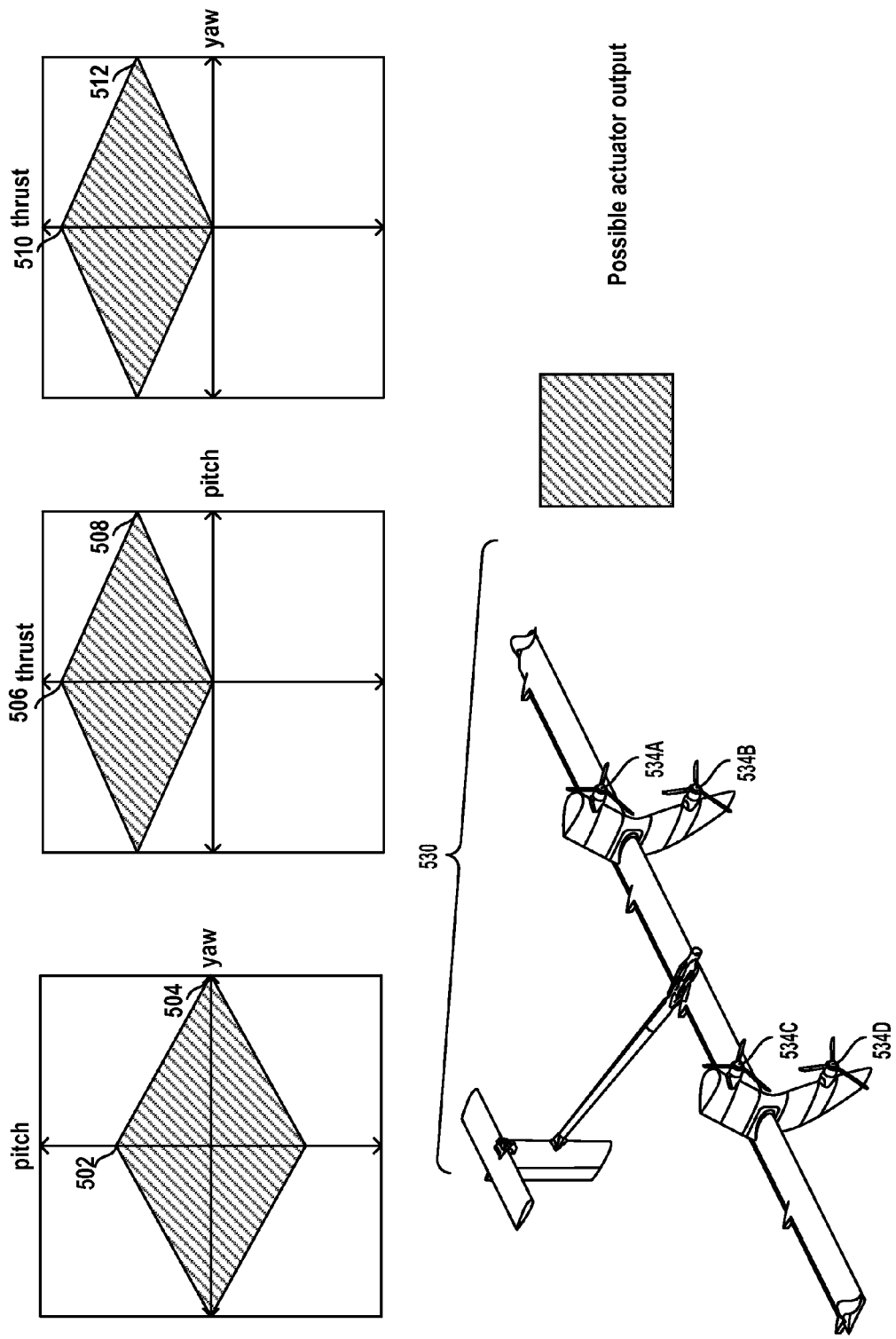
FIG. 5 depicts an example ability of the actuators of the aircraft to concurrently provide pitch, yaw, and thrust adjustments.

FIG. 5 depicts an example ability of actuators 534A-D of an aircraft 530 to concurrently provide pitch, yaw, and thrust adjustments. For example, as shown at maximum pitch rate 502, a maximum positive pitch adjustment rate for the aircraft 530 may require having the actuators 543B and 534D provide full powered thrust while the actuators 534A and 534C idle. However, as shown at maximum yaw rate 504, a maximum positive yaw adjustment rate for the aircraft 530 may require the actuators 534A and 534B to provide full thrust while the actuators 534C and 534D idle. Therefore, in this configuration, the actuators 534A-D may not be able to provide the maximum positive yaw rate and the maximum positive pitch rate concurrently because of conflicting demands of actuators 534A and 534C. Examples are also illustrated in the table of FIG. 1.

Likewise, a thrust configured to provide a maximum rate of position change may require all four actuators 534A-D to provide full thrust, as shown at maximum thrust point 506. However, a maximum positive pitch adjustment rate 508 may require that the actuators 534B and 534D provide full thrust while the actuators 534A and 534C idle. Therefore, requests for maximum pitch rate may conflict with a request for a maximum thrust force. Similarly, a request for maximum thrust as shown at point 510 may conflict with a request for a maximum yaw adjustment rate as shown at point 512. A maximized rate of position change may require all actuators 534A-D to provide full thrust whereas a maximum positive yaw rate may require the actuators 534A and 534B to provide full thrust while the actuators 534C and 534D idle.

Figure 6:
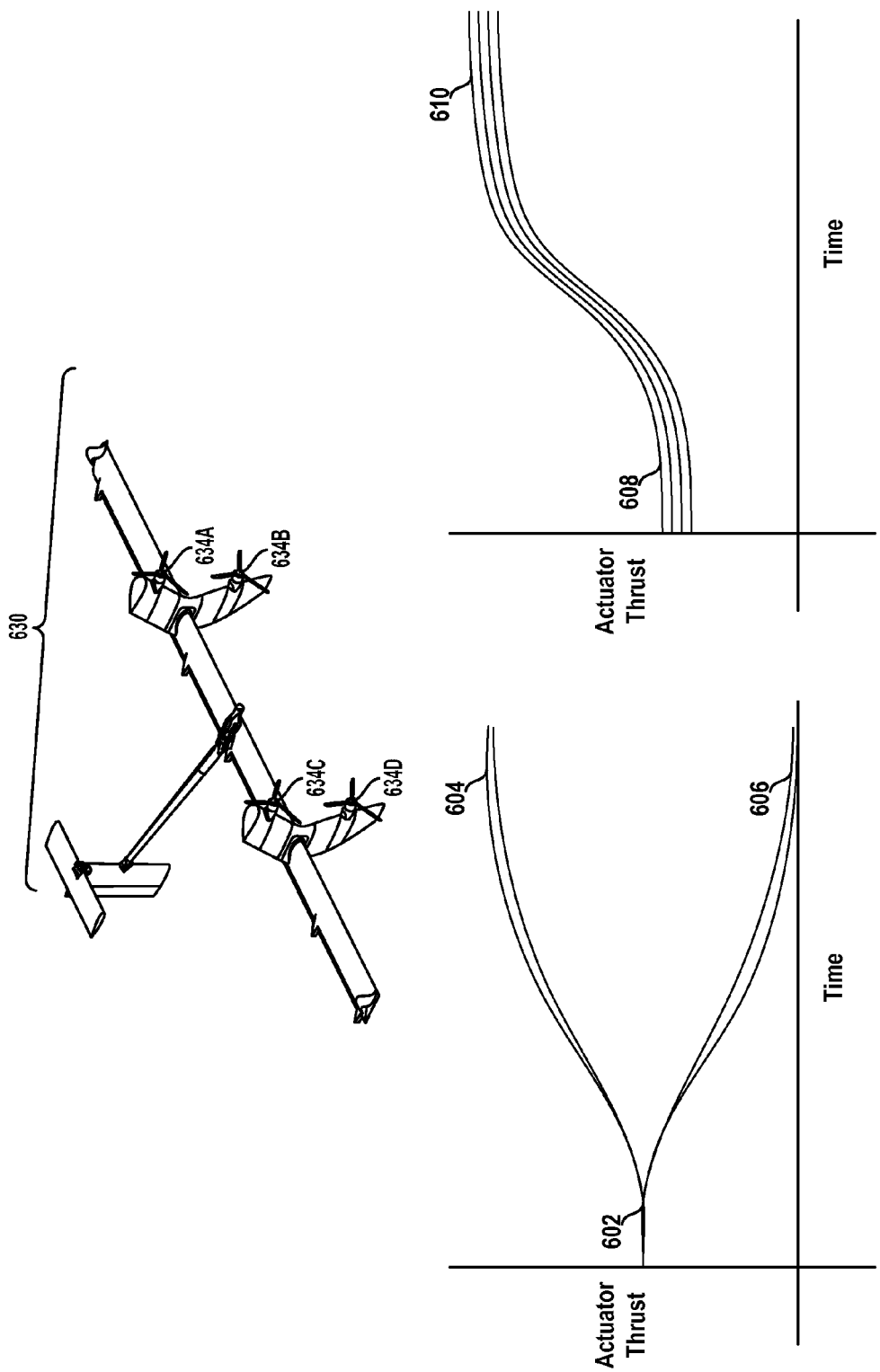
FIG. 6A depicts example changes in amounts of thrust provided by the actuators over time in response to a request to provide the maximum yaw adjustment rate or the maximum pitch adjustment rate.
FIG. 6B depicts example changes in amounts of thrust provided by actuators over time in response to a request to provide the full forward thrust available to the aircraft.

FIG. 6A depicts example changes in amounts of thrust provided by the actuators over time in response to a request to provide the maximum yaw adjustment rate or the maximum pitch adjustment rate. The amount of thrust provided by an actuator may also correspond to a rotational speed of a motor driving the actuator. At point 602, all actuators 634A-D of an aircraft 630 are providing a substantially equal thrust force that is less than a maximum thrust level of the actuators 634A-D. After a request to provide the maximum pitch rate, the actuators 634A and 634C may change the respective thrust provided to the maximum thrust level, as shown at point 604, while actuators 634B and 634D may change the respective thrust provided to zero (or about zero), as shown at point 606. At a time represented by points 604 and 606, the aircraft 630 may be engaged in its maximum pitch rate, a zero yaw rate, and half of a total forward thrust available from the four actuators 634A-D. Alternatively, points 604 and 606 may also represent the aircraft 630 engaged in its maximum yaw rate, a zero pitch rate, and half of a total forward thrust available from the four actuators 634A-D. An example would include the actuators 634A and 634B providing full thrust while the actuators 634C and 634D idle. (Curves of FIG. 6A representing the thrust of the actuators 634A and 634C are separated at point 604 to illustrate that multiple actuators may be providing a maximum thrust level. The actuators 634A and 634C may provide a substantially equal amount of thrust at point 604. Likewise, the actuators 634B and 634D may provide a substantially equal amount of thrust at point 606. Other embodiments may include any number of actuators.)

FIG. 6B depicts example changes in amounts of thrust provided by the actuators over time in response to a request to provide the full forward thrust available to the aircraft 630. The amount of thrust provided by an actuator may also correspond to a rotational speed of a motor driving the actuator. At point 608, all actuators 634A-D of the aircraft 630 are providing a substantially equal thrust force that is less than a maximum thrust level of the actuators 634A-D. After a request is received for the aircraft to engage in maximum forward thrust, all four actuators may change the thrust provided to the maximum thrust level. At the point 610, maximum forward thrust is provided with a zero pitch rate and a zero yaw rate. (Curves of FIG. 6B representing the thrust of the actuators 634A-D may be separated at points 608 and 610 to illustrate that multiple actuators are providing substantially equal amounts of thrust at points 608 and 610. Other embodiments may include any number of actuators.)

Figure 7:
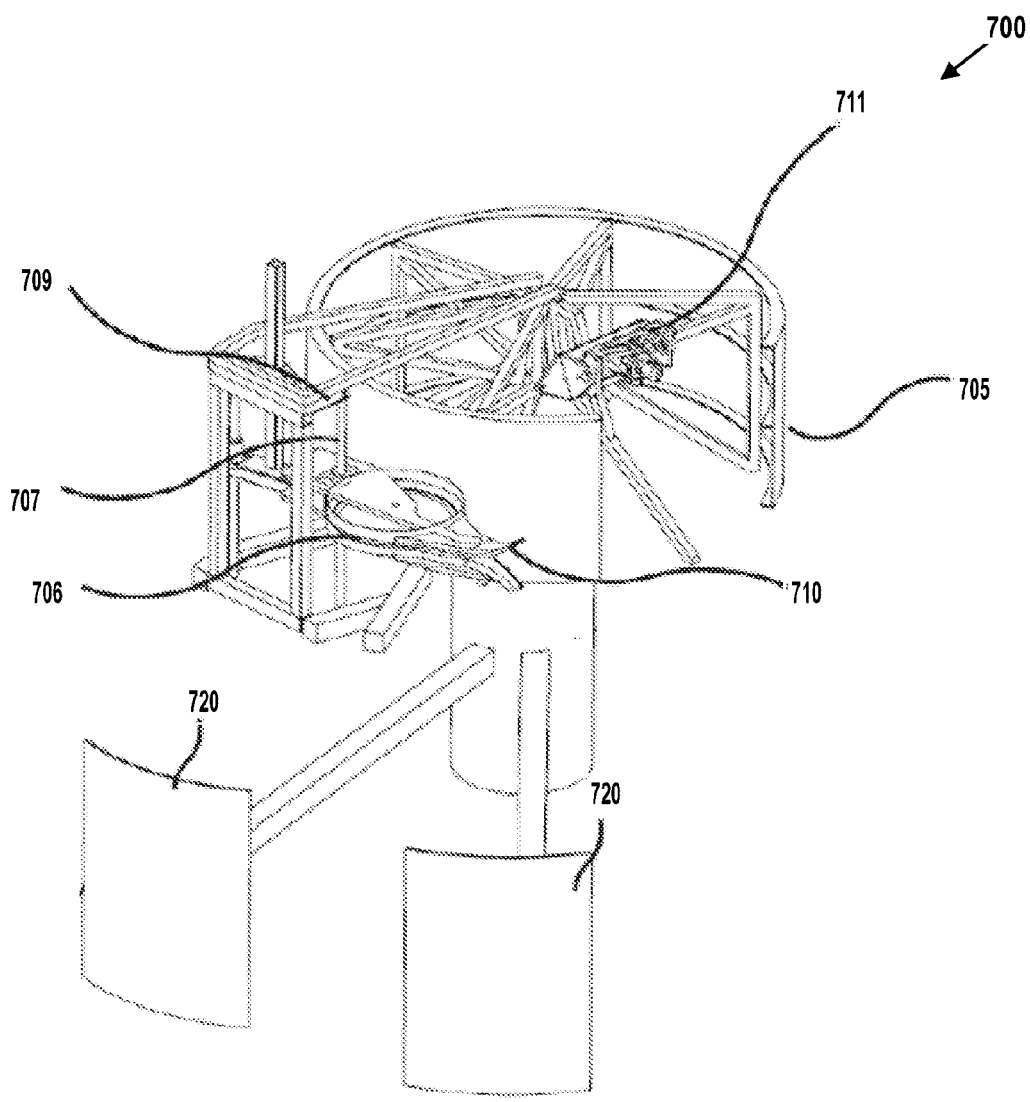
FIG. 7 depicts an example of the ground station of the tethered flight system.

FIG. 7 depicts an example ground station 700 of the tethered flight system, which may include a winch drum 705, a levelwind 706, a steel rail 707, a top stop 709, levelwind guides 710, a gimbal 711 and perch buckets 720. The winch drum 705 may be configured to wind the tether around the winch drum 705 as the tether is reeled in or out and may include grooves in which the tether rests as the tether is reeled in or out. The tether may be guided onto the winch drum 705 by the levelwind 706. The levelwind 706 may include a single pulley mounted on a pivot, such that the levelwind 706 may follow vertical motions of the tether as the tether is reeled in or reeled out. The levelwind 706 may be supported by steel rails 707, and driven by a leadscrew attached to a drivetrain that drives the winch drum 705. The levelwind 706 further comprises levelwind guides 710 which may guide the tether into the levelwind pulley. The leadscrew and drivetrain may be oriented such that the levelwind moves upward as the tether is reeled out. As the levelwind reaches its maximum extent at the top of its range of motion, it may hit a top stop 709, which prevents the levelwind from pivoting and holds the levelwind level. In a situation in which the levelwind is beginning to engage the tether during reel in, the top stop 709 holds the levelwind level such that the tether is guided into the levelwind 706 by the levelwind guides 710.

The ground station may also include the gimbal 711, which may be configured to attach an end of the tether to the ground station 700 so as to allow free movement of the tether in multiple axes. The ground station 700 may further include perch buckets 720. The perch buckets 720 may include a cavity defined by a perch bottom stop and a perch engagement surface (shown in FIG. 8) configured to couple to landing pegs of the aircraft. The perch buckets 720 may be constructed to support the weight of the aircraft at rest. The aircraft may be configured to come to a stable rest on perch buckets 720 upon landing.

Figure 8:
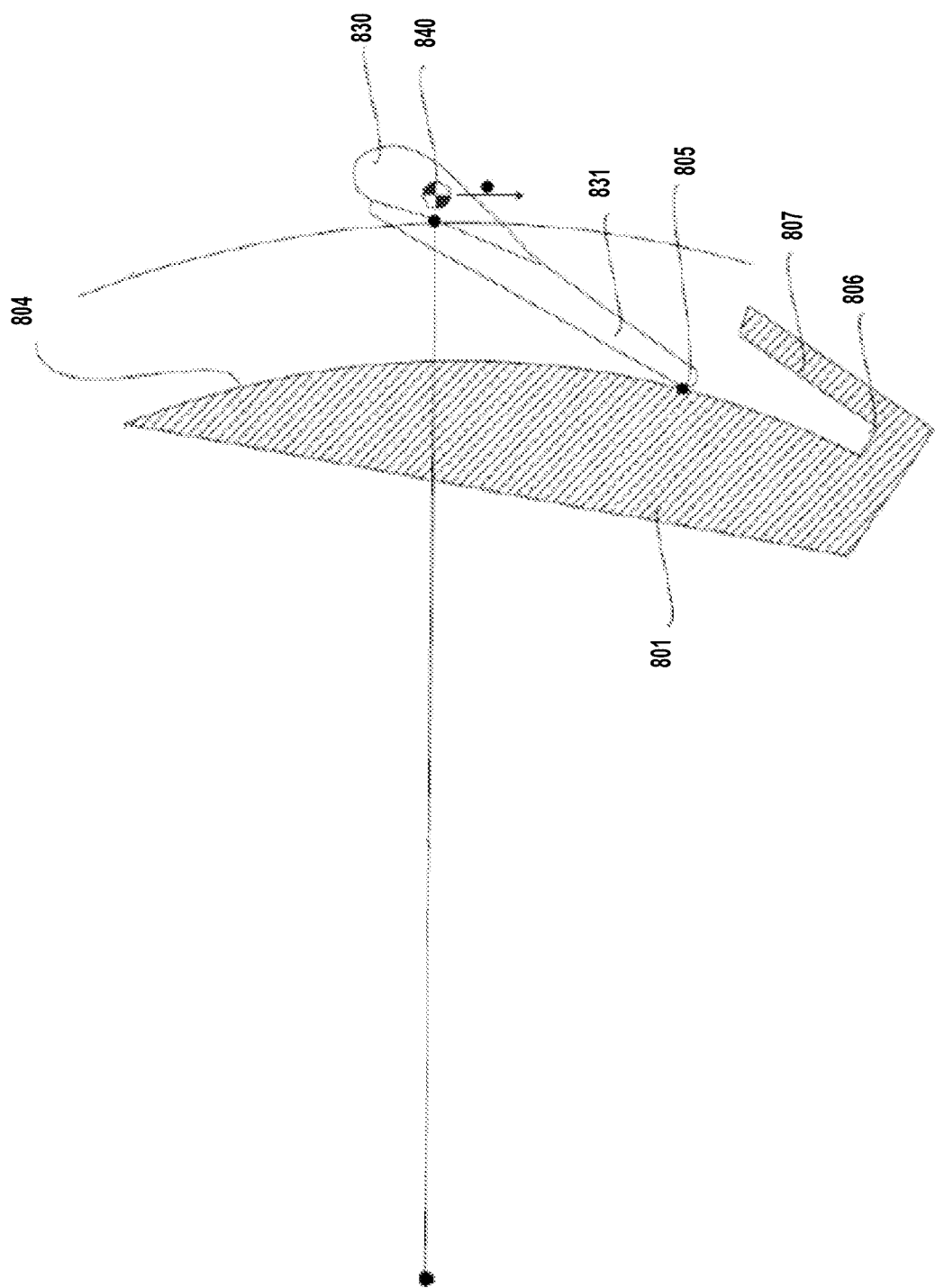
FIG. 8 depicts a side view of an example aircraft landing on a perch bucket of the ground station.

FIG. 8 depicts a side view of the aircraft landing on a perch bucket of the ground station. A perch bucket 801 includes, a perch backstop 804, a perch contact point 805, a perch bottom stop 806, and a perch engagement surface 807. An aircraft 830 includes a landing peg 831 and a center of mass 840.

During a landing of the aircraft 830, the landing peg 831 of the aircraft 830 may contact the perch backstop 804 at any point between depicted perch contact point 805 and the top of perch backstop 804. After the landing peg 831 engages the perch backstop 804 at the perch contact point 805, an actuator of the aircraft 802 may reduce thrust, causing the aircraft 830 to decrease altitude, and the perch contact point 805 may slide down the perch backstop 804 until the landing peg 831 contacts the perch bottom stop 806. Next, the actuator on the aircraft 830 may be idled and the landing peg 831 of the aircraft 830 may rest against the perch bottom stop 806 and the perch engagement surface 807. The perch bottom stop 806 may be substantially offset on a horizontal axis from the center of mass 840 of the aircraft 830, such that the gravitational force on the aircraft 830 pushes the landing peg 831 against the perch engagement surface 807, so that the aircraft 830 is safely resting on the perch bucket 801 of the ground station.

Figure 9:
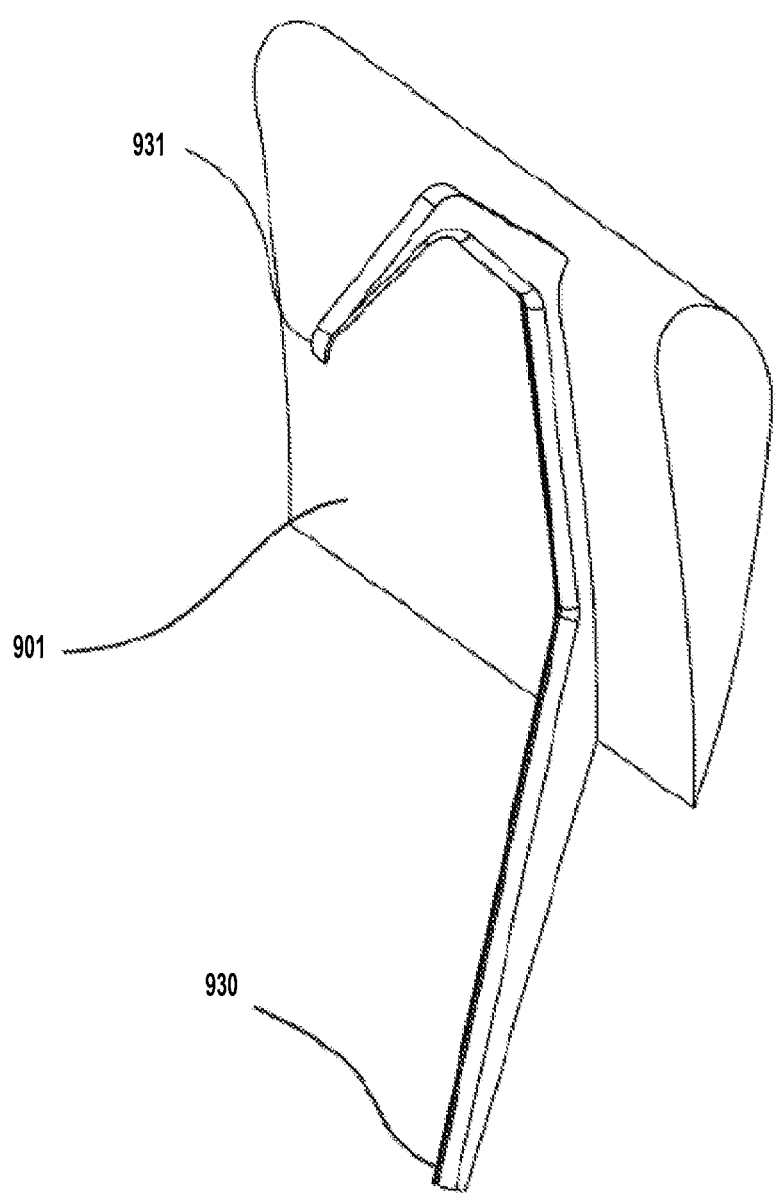
FIG. 9 depicts a portion of an example main wing of the aircraft.

FIG. 9 depicts a portion of an example main wing 901 of the aircraft, including a landing peg 930 and a hook 931. The landing peg 930 may configured to couple with the perch bucket of the ground station, and the hook 931 may be configured to secure the main wing to the perch bucket by coupling to a top of the perch bucket. The peg 930 and the hook 931 may be bonded to the main wing 901. In some embodiments, the peg 930 is integrated into a fuselage of the aircraft or the hook 931 is integrated into the pylons holding the actuators on the aircraft. In another example, the hook 931 may not be included as part of the main wing 901 and the aircraft may rest on the ground station by the coupling of the landing peg 930 with the perch bucket.

Figure 10:
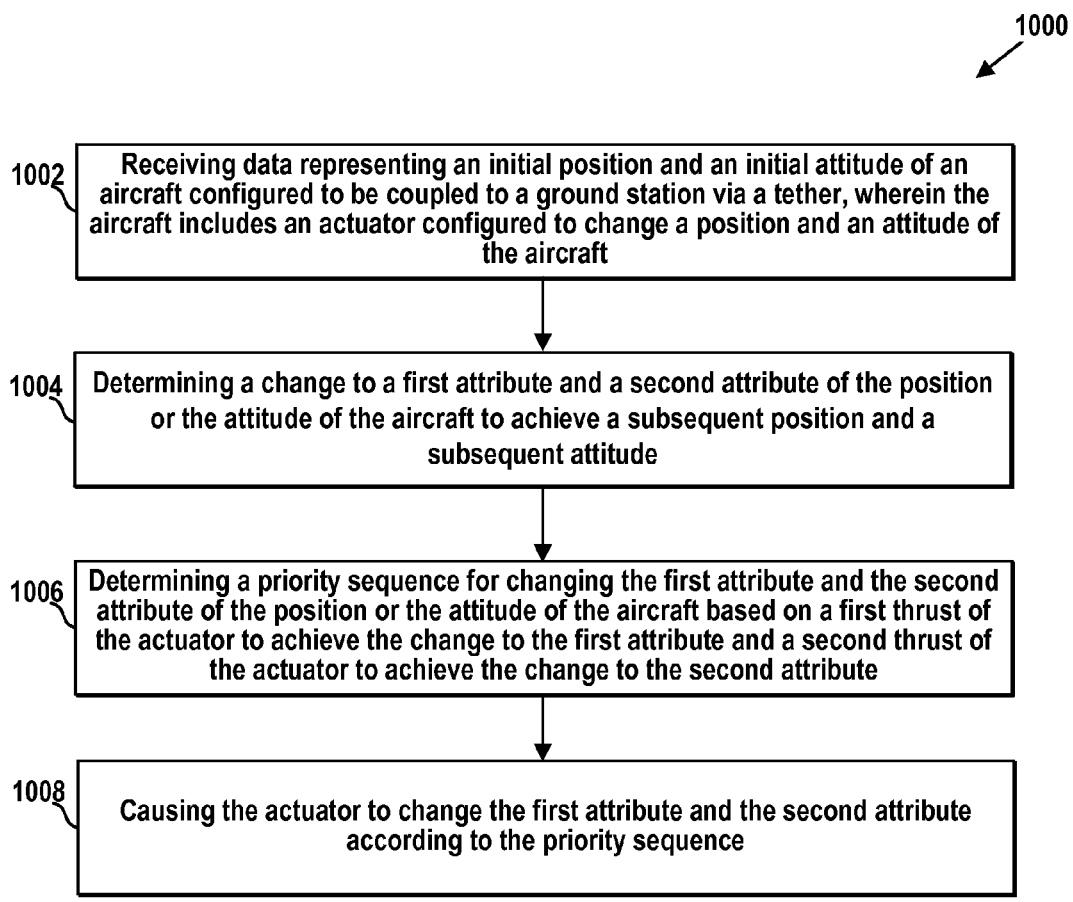
FIG. 10 is a block diagram of an example method for determining a priority sequence for changing the position and the attitude of the aircraft.

FIG. 10 is a block diagram of an example method 1000 for determining a priority sequence for changing a first attribute and a second attribute of the position and the attitude of the aircraft, in accordance with at least some embodiments described herein. Method 1000 shown in FIG. 10 presents an embodiment of a method that, for example, could be used with a computing device. Method 1000 may include one or more operations, functions, or actions as illustrated by one or more blocks of 1002-1008. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 1000 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 1000 and other processes and methods disclosed herein, each block in FIG. 10 may represent circuitry that is wired to perform the specific logical functions in the process.

Functions of the method 1000 may be fully performed by a processor of a computing device, by a computing device, or may be distributed across multiple processors or multiple computing devices and/or a server. In some examples, the computing device may receive information from sensors of the computing device, or where the computing device is a server the information can be received from another device that collects the information.

At block 1002, the method 1000 includes receiving data representing an initial position and an initial attitude of an aircraft. The aircraft may be configured to be coupled to a ground station via a tether and may include an actuator, such as a propeller, configured to change the position and the attitude of the aircraft. A processor included in the ground station or the aircraft may receive the data from a sensor of the aircraft, the tether, or the ground station. Such positional data may include attributes of position such as a horizontal distance between the aircraft and the ground station, an azimuth angle of the aircraft, and an altitude of the aircraft. A horizontal distance may be a distance along the ground. Alternatively, the positional data may be expressed in rectangular or spherical coordinates and may be expressed without reference to a position of the ground station. The data representing the attitude of the aircraft may include attributes of attitude such as a yaw angle, a pitch angle, and a roll angle of the aircraft. The angles may represent angles of rotation about various axes of the aircraft. The position and attitude data may further include location coordinates as well.

At block 1004, the method 1000 includes determining a change to a first attribute and a second attribute of the position or the attitude of the aircraft to achieve a subsequent position and a subsequent attitude. Determining a change to an attribute of the position of the aircraft to achieve a subsequent position may include determining a horizontal distance between the aircraft and the subsequent position, determining a vertical distance between the aircraft and the subsequent position, and determining an azimuth angle between the azimuth angle of the aircraft and an azimuth angle of the subsequent position. Determining a change to an attribute of the attitude of the aircraft to achieve a subsequent attitude may also include determining a yaw comparison angle between the yaw angle of the aircraft and a yaw angle of the subsequent attitude, determining a roll comparison angle between the roll angle of the aircraft and a roll angle of the subsequent attitude, and determining a pitch comparison angle between the pitch angle of the aircraft and a pitch angle of the subsequent attitude. The respective yaw, roll, and pitch comparison angles may represent a change in the respective yaw, pitch, and roll angles of the aircraft that are required to place the aircraft in the subsequent attitude.

In some embodiments, a change to an attribute of the position or the attitude of the aircraft may initially move the aircraft away from the subsequent position or the subsequent attitude to later return the aircraft to the subsequent position or the subsequent attitude. For example, if the aircraft is initially oriented so that the actuator is configured to provide a vertical thrust substantially perpendicular to the ground, a change in the yaw angle of the aircraft may orient the actuator away from the subsequent attitude to provide thrust in a direction to achieve a subsequent position located at a different azimuth angle. After the subsequent position is achieved, the attitude may be adjusted to the subsequent attitude which may be such that the actuator is positioned to provide a vertical thrust substantially perpendicular to the ground. By further example, if the aircraft is initially oriented so that the actuator is configured to provide a vertical thrust substantially perpendicular to the ground, a change in the pitch angle of the aircraft may orient the actuator away from the subsequent attitude to provide thrust in a direction to achieve a subsequent position located at a different horizontal distance from the ground station. After the subsequent position is achieved, the attitude may be adjusted to the subsequent attitude which may be such that the actuator is positioned to provide a vertical thrust substantially perpendicular to the ground.

The change to the subsequent position and the subsequent attitude may be determined based on the processor receiving a notification that the aircraft is moving away from the subsequent position and attitude, perhaps because of a high wind condition. While in the subsequent attitude, the aircraft may be configured for hover flight and be aligned to land and couple with a perch bucket of the ground station. Thus, within examples, the subsequent position and/or the subsequent attitude may be determined by the ground station or the aircraft and may correspond to a position and attitude desirable for landing the aircraft. The method may be used to control the flight path of the aircraft as the aircraft is deployed or as the aircraft is landing on the ground station.

At block 1006, the method 1000 includes determining a priority sequence for changing the first attribute and the second attribute of the position or the attitude of the aircraft based on a first thrust of the actuator to achieve the change to the first attribute and a second thrust of the actuator to achieve the change to the second attribute. The priority sequence may be determined so that the first attribute is changed before the second attribute is changed in cases where the actuator is unable to concurrently provide thrusts that correspond to conflicting requests to maneuver the aircraft.

Determining the priority sequence may include receiving data representing a threshold distance and determining whether a distance of the aircraft from the ground station is greater than, less than, or equal to the threshold distance. The priority sequence may be determined based on whether the distance between the aircraft and the ground station is greater than, less than, or equal to the threshold distance. For example, the aircraft may have less space to freely maneuver in certain directions or rotate about certain axes while landing on or deploying from the ground station, for example, when the distance between the aircraft and the ground station is less than the threshold distance. The priority sequence may also be configured so that the aircraft avoids collisions with the ground station based on the position and attitude of the aircraft. In one embodiment, the threshold distance may be about 50 meters and the tether may be about 450 meters long.

By further example, when the distance between the aircraft and the ground station is less than the threshold distance, a yaw angle of the aircraft may be prioritized before a pitch angle of the aircraft in the priority sequence because docking between the ground station and the aircraft may require the yaw angle of the aircraft to remain within a smaller range of angles than may be required for the pitch angle of the aircraft. It may also be possible to control the pitch angle of the aircraft by the ground station controlling the tension of the tether. By using the tether to control the pitch angle of the aircraft, the actuator may be able to provide a thrust to change the yaw angle of the aircraft that may otherwise conflict with the pitch adjustment. Pitch may also be controlled via another designated actuator, leaving the original actuator to provide thrust for yaw adjustment.

For similar reasons, the yaw angle of the aircraft may be prioritized for change before the roll angle of the aircraft based on the distance of the aircraft from the ground station being less than the threshold distance. Docking of the aircraft with the ground station may require the yaw angle of the aircraft to remain within a smaller range of angles than may be required for the roll angle of the aircraft. Also, the roll angle of the aircraft may be controlled using flaps on a wing of the aircraft, leaving the actuator to provide a thrust to change the yaw angle of the aircraft that may otherwise conflict with the roll adjustment.

Likewise, the yaw angle of the aircraft may be prioritized for change before the azimuth angle of the aircraft based on the distance of the aircraft from the ground station being less than the threshold distance. Docking of the aircraft with the ground station may require the yaw angle of the aircraft to remain within a smaller range of angles than may be required for the azimuth angle of the aircraft because the ground station may be configured to freely swivel in an azimuth direction to follow the tether and the aircraft.

Also, the altitude of the aircraft may be prioritized for change before the pitch angle of the aircraft based on the distance of the aircraft from the ground station being less than the threshold distance. Increasing the altitude of the aircraft may be achieved via the actuator of the aircraft, whereas the pitch angle of the aircraft may be controlled by the ground station increasing or decreasing a tension of the tether. Such adjustments in tether tension may cause the aircraft to rotate about the pitch axis of the aircraft. The pitch angle of the aircraft may also be controlled by an additional actuator designated for pitch control, such that the original actuator may provide the thrust for altitude adjustment.

The altitude of the aircraft may also be prioritized for change before the roll angle and the azimuth angle of the aircraft based on the aircraft being within the threshold distance of the ground station. Flaps of a wing of the aircraft may be used to change the roll angle of the aircraft and the ground station may swivel to follow the aircraft in the azimuth direction, which may leave the actuator to provide a thrust to change the altitude of the aircraft that may otherwise conflict with the roll adjustment or the azimuth adjustment.

By further example, the pitch angle of the aircraft may be prioritized to be changed before the roll angle and the azimuth angle of the aircraft based on the aircraft being within the threshold distance of the ground station. Landing or deploying the aircraft may require the pitch angle of the aircraft to be within a smaller range of angles than is required for the roll angle of the aircraft. Flaps of the wing of the aircraft may be used to change the roll angle of the aircraft and the ground station may swivel to follow the aircraft in the azimuth direction, which may leave the actuator to provide a thrust to change the pitch angle of the aircraft that may otherwise conflict with the roll adjustment or the azimuth adjustment.

However, when the distance of the aircraft from the ground station is greater than or equal to the threshold distance, the yaw angle of the aircraft may be prioritized for change before the azimuth angle of the aircraft. When the aircraft is at least the threshold distance away from the ground station, the priority sequence may be configured so that the azimuthal angle of the aircraft is maintained directly downwind from the ground station (or a certain azimuthal angle offset from directly downwind). Although, in some embodiments, controlling the azimuth angle of the aircraft may have more value than controlling the yaw angle of the aircraft beyond the threshold distance, a change in the azimuth angle of the aircraft may require the aircraft to first change the yaw angle of the aircraft so that the actuator is positioned to provide a thrust in the azimuthal direction. The yaw angle of the aircraft may be changed back to the subsequent attitude after the azimuth angle of the aircraft has been changed toward the subsequent position. In one embodiment, the yaw angle of the subsequent attitude may be such that the actuator of the aircraft is positioned to provide a vertical thrust substantially perpendicular to the ground.

Similarly, the yaw angle of the aircraft may be prioritized for change before the altitude of the aircraft when the distance of the aircraft from the ground station is at least the threshold distance. For example, effective control of the altitude of the aircraft may require that the yaw angle of the aircraft is such that the actuator of the aircraft is in position to provide a vertical thrust substantially perpendicular to the ground to increase the altitude of the aircraft.

By further example, the pitch angle of the aircraft may be prioritized for change before the altitude of the aircraft when the distance of the aircraft from the ground station is at least the threshold distance. Effective control of the altitude of the aircraft may require that the pitch angle of the aircraft is such that the actuator of the aircraft is in position to provide a substantially vertical thrust perpendicular to the ground to increase the altitude of the aircraft.

When the distance of the aircraft from the ground station is at least the threshold distance, the azimuth angle of the aircraft may be prioritized for change before of the roll angle of the aircraft. Transitioning the aircraft between hover flight and cross-wind flight may require more precision in an azimuth angle of the aircraft than in the roll angle of the aircraft.

The method 1000 may also include receiving data representing a tension force on the tether and a predetermined tension force. The data representing the tension force on the tether may be received from a sensor of the aircraft, the tether, or the ground station. The data representing the predetermined tension force may be retrieved from memory or received as an input from an input device. The processor may receive the data and determine whether the tension force on the tether is substantially equal to the predetermined tension force. Based on the predetermined tension force and the tension force on the tether being unequal, the actuator may cause the aircraft to rotate the aircraft about the pitch axis of the aircraft. The rotation of the aircraft about the pitch axis may move a point at which the tether couples to the aircraft toward or away from the ground station, thereby reducing or increasing the tension force on the tether until the tension force is substantially equal to the threshold tension force.

The method 1000 may also include receiving data representing a speed of a wind within an ambient environment of the aircraft and a threshold wind speed. Data representing the speed of the wind within the ambient environment of the aircraft may be received from sensors of the aircraft or the ground station and data representing the threshold wind speed may be received from an input device. A processor may next determine whether the speed of the wind within the ambient environment of the aircraft is greater than the threshold wind speed. Additionally, the aircraft may include an additional actuator that, during hover flight in high winds, is configured to generate a drag force or a lift force from an impact of the wind within the ambient environment of the aircraft. The drag force or lift force may create a torque about the pitch axis of the aircraft. In this way, the priority sequence, based on the speed of the wind within the ambient environment of the aircraft being greater than the threshold wind speed, may be configured so that another actuator of the aircraft may provide a thrust that changes a yaw angle or an altitude of the aircraft before providing a thrust that changes a pitch angle of the aircraft.

At block 1008, the method 1000 includes causing the actuator to change the first attribute and the second attribute according to the priority sequence. The processor may generate a request to be received by the control system of the aircraft and the control system may cause the actuator to move the aircraft. By further example, the aircraft may include an additional actuator configured to provide angular thrust for the aircraft about various axes of the aircraft. The control system may rotate the aircraft to the subsequent attitude by causing the actuator to provide an angular thrust about an axis of the aircraft and causing the additional actuator to idle. In this way, pairs of actuators may be configured to move the aircraft in opposite rotational directions with respect to an axis of the aircraft.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by one or more processors, data indicating an initial position and an initial attitude of an aircraft configured to be coupled to a ground station via a tether, wherein the aircraft includes an actuator configured to change a position and an attitude of the aircraft;
   based on the received data, determining, by the one or more processors, a first level of thrust that, when provided by the actuator, facilitates changing a first attribute of the position or the attitude of the aircraft to a subsequent position or a subsequent attitude;
   based on the received data, determining, by the one or more processors, a second level of thrust that, when provided by the actuator, facilitates changing a second attribute of the position or the attitude of the aircraft to the subsequent position or the subsequent attitude;
   determining, by the one or more processors, that the first level of thrust conflicts with the second level of thrust; and
   in response to determining that the first level of thrust conflicts with the second level of thrust, causing the actuator to provide the first level of thrust based on a priority sequence that prioritizes the first attribute above the second attribute.

2. The method of claim 1, wherein the first attribute is a yaw angle of the aircraft, and wherein the second attribute is a pitch angle of the aircraft, the method further comprising:
   determining that the aircraft is less than a threshold distance away from the ground station,
   wherein causing the actuator to provide the first level of thrust is performed also in response to determining that aircraft is less than the threshold distance away from the ground station.

3. The method of claim 1, wherein the first attribute is a yaw angle of the aircraft, and wherein the second attribute is a roll angle of the aircraft, the method further comprising:
   determining that the aircraft is less than a threshold distance away from the ground station,
   wherein causing the actuator to provide the first level of thrust is performed also in response to determining that the aircraft is less than the threshold distance away from the ground station.

4. The method of claim 1, wherein the first attribute is a yaw angle of the aircraft, and wherein the second attribute is an azimuth angle of the aircraft, the method further comprising:
   determining that the aircraft is less than a threshold distance away from the ground station,
   wherein causing the actuator to provide the first level of thrust is performed also in response to determining that the aircraft is less than the threshold distance away from the ground station.

5. The method of claim 1, wherein the first attribute is an altitude of the aircraft, and wherein the second attribute is a pitch angle of the aircraft, the method further comprising:
   determining that the aircraft is less than a threshold distance away from the ground station,
   wherein causing the actuator to provide the first level of thrust is performed also in response to determining that the aircraft is less than the threshold distance away from the ground station.

6. The method of claim 1, wherein the first attribute is an altitude of the aircraft, and wherein the second attribute is a roll angle of the aircraft, the method further comprising:
determining that the aircraft is less than a threshold distance away from the ground station,
wherein causing the actuator to provide the first level of thrust is performed also in response to determining that the aircraft is less than the threshold distance away from the ground station.

7. The method of claim 1, wherein the first attribute is an altitude of the aircraft, and wherein the second attribute is an azimuth angle of the aircraft, the method comprising:
determining that the aircraft is less than a threshold distance away from the ground station,
wherein causing the actuator to provide the first level of thrust is performed also in response to determining that the aircraft is less than the threshold distance away from the ground station.

8. The method of claim 1, wherein the first attribute is a pitch angle of the aircraft, and wherein the second attribute is a roll angle of the aircraft, the method further comprising:
determining that the aircraft is less than a threshold distance away from the ground station,
wherein causing the actuator to provide the first level of thrust is performed also in response to determining that the aircraft is less than the threshold distance away from the ground station.

9. The method of claim 1, wherein the first attribute is a pitch angle of the aircraft, and wherein the second attribute is an azimuth angle of the aircraft, the method further comprising:
determining that the aircraft is less than a threshold distance away from the ground station,
wherein causing the actuator to provide the first level of thrust is performed also in response to determining that the aircraft is less than the threshold distance away from the ground station.

10. The method of claim 1, wherein the first attribute is a yaw angle of the aircraft, and wherein the second attribute is an azimuth angle of the aircraft, the method further comprising:
determining that the aircraft is greater than a threshold distance away from the ground station,
wherein causing the actuator to provide the first level of thrust is performed also in response to determining that the aircraft is greater than the threshold distance away from the ground station.

11. The method of claim 1, wherein the first attribute is a yaw angle of the aircraft, and wherein the second attribute is an altitude of the aircraft, the method further comprising:
determining that the aircraft is greater than a threshold distance away from the ground station,
wherein causing the actuator to provide the first level of thrust is performed also in response to determining that the aircraft is greater than the threshold distance away from the ground station.

12. The method of claim 1, wherein the first attribute is a pitch angle of the aircraft, and wherein the second attribute is an altitude of the aircraft, the method further comprising:
determining that the aircraft is greater than a threshold distance away from the ground station,
wherein causing the actuator to provide the first level of thrust is performed also in response to determining that the aircraft is greater than the threshold distance away from the ground station.

13. The method of claim 1, wherein the first attribute is an azimuth angle of the aircraft, and wherein the second attribute is a roll angle of the aircraft, the method further comprising:
determining that the aircraft is greater than a threshold distance away from the ground station,
wherein causing the actuator to provide the first level of thrust is performed also in response to determining that the aircraft is greater than the threshold distance away from the ground station.

14. The method of claim 1, further comprising:
receiving data representing a tension force on the tether;
determining that the tension force on the tether is not substantially equal to a predetermined tension force; and
causing the actuator to rotate the aircraft about a pitch axis of the aircraft so that the tension force on the tether becomes substantially equal to the predetermined tension force.

15. The method of claim 1, wherein the first attribute is a yaw angle of the aircraft, and wherein the second attribute is a pitch angle of the aircraft, the method further comprising:
receiving data representing a speed of a wind within an ambient environment of the aircraft; and
determining that the speed of the wind within the ambient environment of the aircraft is greater than a threshold wind speed,
wherein causing the actuator to provide the first level of thrust is performed also in response to determining that the speed of the wind within the ambient environment of the aircraft is greater than the threshold wind speed.

16. The method of claim 1, wherein the first attribute is an altitude of the aircraft, and wherein the second attribute is a pitch angle of the aircraft, the method further comprising:
receiving data representing a speed of a wind within an ambient environment of the aircraft; and
determining that the speed of the wind within the ambient environment of the aircraft is greater than a threshold wind speed,
wherein causing the actuator to provide the first level of thrust is performed also in response to determining that the speed of the wind within the ambient environment of the aircraft is greater than the threshold wind speed.

17. A non-transitory computer readable storage memory having stored therein instructions that, when executed by a computing device that includes one or more processors, causes the computing device to perform functions comprising:
receiving, by the one or more processors, data indicating an initial position and an initial attitude of an aircraft configured to be coupled to a ground station via a tether, wherein the aircraft includes an actuator configured to change a position and an attitude of the aircraft;
based on the received data, determining, by the one or more processors, a first level of thrust that, when provided by the actuator, facilitates changing a first attribute of the position or the attitude of the aircraft to a subsequent position or a subsequent attitude;
based on the received data, determining, by the one or more processors, a second level of thrust that, when provided by the actuator, facilitates changing a second attribute of the position or the attitude of the aircraft to the subsequent position or the subsequent attitude;
determining, by the one or more processors, that the first level of thrust conflicts with the second level of thrust; and in response to determining that the first level of thrust conflicts with the second level of thrust, causing the actuator to provide the first level of thrust based on a priority sequence that prioritizes the first attribute above the second attribute.

18. The non-transitory computer readable storage memory of claim 17, wherein the functions further comprise:
   receiving data representing a tension force on the tether;
   determining that the tension force on the tether is not substantially equal to a predetermined tension force; and
   causing the actuator to rotate the aircraft about a pitch axis of the aircraft so that the tension force on the tether becomes substantially equal to the predetermined tension force.

19. A system comprising:
   one or more processors; and
   memory storing instructions that, when executed by the one or more processors, cause the system to perform functions comprising:
      receiving, by the one or more processors, data indicating an initial position and an initial attitude of an aircraft configured to be coupled to a ground station via a tether, wherein the aircraft includes an actuator configured to change a position and an attitude of the aircraft;
      based on the received data, determining, by the one or more processors, a first level of thrust that, when provided by the actuator, facilitates changing a first attribute of the position or the attitude of the aircraft to a subsequent position or a subsequent attitude;
      based on the received data, determining, by the one or more processors, a second level of thrust that, when provided by the actuator, facilitates changing a second attribute of the position or the attitude of the aircraft to the subsequent position or the subsequent attitude;
      determining, by the one or more processors, that the first level of thrust conflicts with the second level of thrust; and
      in response to determining that the first level of thrust conflicts with the second level of thrust, causing the actuator to provide the first level of thrust based on a priority sequence that prioritizes the first attribute above the second attribute.

20. The system of claim 19, wherein the first attribute is a yaw angle of the aircraft, wherein the second attribute is an azimuth angle of the aircraft, and wherein the functions further comprise:
   determining that the aircraft is less than a threshold distance away from the ground station,
   wherein causing the actuator to provide the first level of thrust is performed also in response to determining that the aircraft is less than the threshold distance away from the ground station.

* * * * *